United States Patent
Zeng et al.

(10) Patent No.: US 10,808,364 B2
(45) Date of Patent: Oct. 20, 2020

(54) ONSITE STEEL RAIL LASER PROCESSING ENGINEERING VEHICLE

(71) Applicants: WUHAN NRD LASER ENGINEERING CO., LTD., Ezhou, Hubei (CN); HUAZHONG UNIVERSITY OF SCIENCE AND TECHNOLOGY, Wuhan, Hubei (CN)

(72) Inventors: Xiaoyan Zeng, Hubei (CN); Qianwu Hu, Hubei (CN); Pinghua Guo, Hubei (CN); Xiaoming Xu, Hubei (CN); Ming Jiang, Hubei (CN); Dengzhi Wang, Hubei (CN); Chongyang Li, Hubei (CN); Li Meng, Hubei (CN)

(73) Assignees: WUHAN NRD LASER ENGINEERING CO., LTD., Ezhou, Hubei (CN); HUAZHONG UNIVERSITY OF SCIENCE AND TECHNOLOGY, Wuhan, Hubei (CN)

( * ) Notice: Subject to any disclaimer, the term of this patent is extended or adjusted under 35 U.S.C. 154(b) by 253 days.

(21) Appl. No.: 16/092,676

(22) PCT Filed: Jan. 24, 2018

(86) PCT No.: PCT/CN2018/073991
§ 371 (c)(1),
(2) Date: Oct. 10, 2018

(87) PCT Pub. No.: WO2018/171329
PCT Pub. Date: Sep. 27, 2018

(65) Prior Publication Data
US 2019/0161918 A1  May 30, 2019

(30) Foreign Application Priority Data
Mar. 22, 2017  (CN) .......................... 2017 1 0175088

(51) Int. Cl.
*B23K 26/06* (2014.01)
*E01B 31/18* (2006.01)
(Continued)

(52) U.S. Cl.
CPC .............. *E01B 31/18* (2013.01); *B23K 26/08* (2013.01); *B60F 1/00* (2013.01); *B61D 15/00* (2013.01); *C21D 1/09* (2013.01); *C21D 9/04* (2013.01)

(58) Field of Classification Search
CPC ... B60F 1/00; B61D 15/00; B61L 1/00; B61L 23/045; C21D 1/09; C21D 9/04;
(Continued)

(56) References Cited

U.S. PATENT DOCUMENTS

| | | | | |
|---|---|---|---|---|
| 4,272,664 | A * | 6/1981 | Theurer | B23K 37/08 104/15 |
| 5,992,329 | A * | 11/1999 | Scheuchzer | B23K 11/046 104/15 |
| 6,797,918 | B1 * | 9/2004 | Higgins | B08B 7/0042 219/121.69 |

FOREIGN PATENT DOCUMENTS

| CN | 201206156 Y | 3/2009 |
|---|---|---|
| CN | 101403030 A | 4/2009 |

(Continued)

OTHER PUBLICATIONS

International Search Report and Written Opinion issued in PCT/CN2018/073991, dated May 2, 2018.

*Primary Examiner* — Sang Y Paik
(74) *Attorney, Agent, or Firm* — Hamre, Schumann, Mueller & Larson, P.C.

(57) ABSTRACT

An onsite steel rail laser processing engineering vehicle, including a laser processing power engineering vehicle and a laser processing cart, the laser processing power engineering vehicle is connected to the laser processing cart; the (Continued)

onsite steel rail laser processing engineering vehicle further comprises a transport mechanism disposed on the laser processing power engineering vehicle; through movement and rotation, the transport mechanism transports the laser processing cart into the laser processing power engineering vehicle or transports the laser processing cart out from the laser processing power engineering vehicle and places it on rails.

10 Claims, 6 Drawing Sheets

(51) Int. Cl.
    *B60F 1/00*         (2006.01)
    *C21D 9/04*         (2006.01)
    *C21D 1/09*         (2006.01)
    *B61D 15/00*       (2006.01)
    *B23K 26/08*       (2014.01)

(58) Field of Classification Search
    CPC ....... E01B 31/18; B23K 11/046; B23K 26/00;
                      B23K 26/0096; B23K 26/08; B23K
                      26/082; B23K 26/10; B23K 26/103;
                        B23K 26/34; B23K 26/342; B23K
                  26/352–356; B23K 37/02; B23K 37/0211;
                    B23K 37/0217; B23K 37/0223; B23K
                              37/0229; B23K 37/0241–0252
    USPC .......................................... 219/121.6–121.83
    See application file for complete search history.

(56) References Cited

FOREIGN PATENT DOCUMENTS

| | | |
|---|---|---|
| CN | 201648895 U | 11/2010 |
| CN | 106988175 A | 7/2017 |
| RU | 2418705 C1 | 5/2018 |

\* cited by examiner

ONSITE STEEL RAIL LASER PROCESSING ENGINEERING VEHICLE

BACKGROUND OF THE INVENTION

Technical Field

The present invention belongs to the technical field of laser processing, and more particularly relates to an onsite steel rail laser processing engineering vehicle.

Description of the Related Art

With the increase of the speed, traffic volume and axle load of the train, the rate of wear failure of the steel rail is getting faster and faster due to the impact and friction of the wheel. At present, the methods for improving the life of the steel rails are mainly concentrated on the steel rail heat treatment method and the steel rail material. With the rapid development of laser technology, scholars have applied the laser surface strengthening technology to the surface treatment of the steel rails and achieved good effects.

With the steel rail laser surface strengthening method, not only can fixed-point processing be performed in the production workshop, but also onsite steel rail laser processing can be performed at the railway site by using the dedicated mobile equipment. For example, Chinese patent publication No. 101403030 discloses an onsite laser processing equipment for toughness-strengthening of the steel rail surface, in which the onsite laser processing equipment comprises a laser processing vehicle and a power system container. In the onsite laser processing equipment, the laser processing vehicle has the characteristics of light weight and good maneuverability; and the power system container contains relatively heavy equipment such as an electric generator, a refrigerating machine, an air compressor, a refrigerant dryer, a laser, a power supply and a control system. Further, the power system container can be placed on a truck or a railway locomotive according to the condition of the track, or placed at the processing site. However, the onsite laser processing equipment adopts a separate structural form, and the optical path (optical fiber), circuit, gas path and water path connected to the laser processing vehicle are complicated to be disassembled and installed before and after the transportation, resulting in low overall usability and reliability of the equipment. Meanwhile, in some special road sections (such as mountain railways), the power engineering vehicle cannot be placed close to the railway track, and in a case where the power engineering vehicle does not have the railway track driving function, the combined rail laser processing equipment cannot be used. Further, laser processing can only be performed on one station of a one-sided steel rail by the onsite laser processing equipment at a time, but there are at least four stations on the railway's two steel rails that require laser processing, and laser processing of these different stations must rely on manual adjustment of the position or attitude of the laser processing head, which greatly affects the efficiency of onsite laser processing of the steel rails and results in low level of automation. For the industrial onsite laser processing equipment, the efficiency and automation need to be further increased.

SUMMARY OF THE INVENTION

In view of the above-described problems, the present invention provides an onsite steel rail laser processing engineering vehicle, which has the characteristics of the onsite rail laser processing, and designs components and the connection relation of the components of the online laser processing equipment. The onsite steel rail laser processing engineering vehicle adopts a special structural form, so that when the onsite steel rail laser processing engineering vehicle is in the working state of laser processing, the laser processing power engineering vehicle follows the laser processing cart to move, thereby avoiding the adverse effects of the body vibration, motion accuracy and the like of the laser processing power engineering vehicle on the laser processing accuracy of the steel rails; when the onsite steel rail laser processing engineering vehicle is in the working state of non laser processing, the laser processing cart is housed in the laser processing power engineering vehicle as a whole structural form. The laser processing power engineering vehicle can carry the laser processing cart to quickly reach or leave the site, which improves the equipment utilization efficiency. In addition, the motion executing mechanism can automatically adjust the distance between the two coupling frames, so that the width between the wheels on the two sides of the laser processing cart is adapted to the distance between the two steel rails, which avoids the serpentine movement of the laser processing cart, improves the accuracy of the laser processing on the steel rails, and is beneficial to improve the processing quality.

In order to achieve the above objective, the present invention provides an onsite steel rail laser processing engineering vehicle, comprising a laser processing power engineering vehicle and a laser processing cart, characterized in that the laser processing power engineering vehicle is connected to the laser processing cart; the onsite steel rail laser processing engineering vehicle further comprises a transport mechanism disposed on the laser processing power engineering vehicle; through movement and rotation, the transport mechanism transports the laser processing cart into the laser processing power engineering vehicle or transports the laser processing cart out from the laser processing power engineering vehicle and places it on steel rails;

the laser processing power engineering vehicle and the laser processing cart are presented as a separate and combined structure, and when the laser processing cart is housed in the laser processing power engineering vehicle, the laser processing power engineering vehicle is capable of running with the laser processing cart carried; when the laser processing cart is placed on the steel rails by the transport mechanism, the laser processing power engineering vehicle follows the laser processing cart to move on the steel rails so that the distance between them is kept within a predetermined range.

Further, a front driving control room and a rear driving control room are provided in the laser processing power engineering vehicle, and a first operation interface of the traction control system and a first operation interface of the laser operation control system are provided in the front driving control room; a second operation interface of the traction control system and a second operation interface of the laser operation control system are provided in the rear driving control room; the first operation interface of the traction control system and the second operation interface of the traction control system have the same function; the first operation interface the laser operation control system and the second operation interface of the laser operation control system also have the same function;

when the onsite steel rail laser processing engineering vehicle is in a working state of laser processing, the laser processing cart is placed on the steel rails, and its movement is controlled by the laser operation control system through the first operation interface or through the second operation interface to meet the requirements of laser processing; meanwhile, the movement of the laser processing power engineering vehicle on the steel rails is controlled by the traction control system through the first operation interface or through the second operation interface to enable the laser processing power engineering vehicle to follow the laser processing cart; when the onsite steel rail laser processing engineering vehicle is in a working state of non laser processing, the laser processing cart is housed in the laser processing power engineering vehicle, a running speed of the laser processing power engineering vehicle is larger than that of the laser processing power engineering vehicle in the working state of laser processing.

Further, the laser processing cart includes a first motion executing mechanism and a first set of laser processing heads connected to the first motion executing mechanism, in which the first motion executing mechanism is a three-axis mechanism and is capable of adjusting the position and attitude of the first set of laser processing heads through movement and rotation, thereby enabling the first set of laser processing heads to perform laser processing on different parts of the two steel rails.

Further, the laser processing cart further includes a cart body, a second motion executing mechanism and a second set of laser processing heads, the first motion executing mechanism and the second motion executing mechanisms are respectively connected to opposite ends of the cart body and have the same structure; the second set of laser processing heads are connected to the second motion executing mechanisms, and the first set of laser processing heads and the second set of laser processing heads have the same structure; the first set of laser processing heads and the second set of laser processing heads each comprise more than two laser processing heads.

Further, the cart body includes a frame, a first coupling frame and a second coupling frame that are slidably connected to opposite ends of the frame, a first front wheel cylinder and a second front wheel cylinder that are fixed on the frame and located between the first coupling frame and the second coupling frame, a first front wheel and a first rear wheel mounted on the bottom end of the first coupling frame, a second front wheel and a second rear wheel mounted on the second coupling frame, a piston rod connected to the first front wheel cylinder, a first front wheel spring of the first coupling frame, a piston rod connected to the second front wheel cylinder and a second front wheel spring of the second coupling frame; amounts of compression of the first front wheel spring and the second front wheel spring are respectively regulated by adjusting air pressure values of the first front wheel cylinder and the second front wheel cylinder, and then the distance between the first coupling frame and the second coupling frame is adjusted such that edges of the first front wheel and the second front wheel are actively abutted against the steel rails on two sides, respectively, and edges of the first rear wheel and the second rear wheel are abutted against the steel rails on two sides, respectively.

Further, the first motion executing mechanism includes a Z-axis working table, a Z-axis servo motor, a Z-axis slide carriage, a Y-axis working table, a Y-axis servo motor, a Y-axis slide carriage, a A-axis working table, a A-axis servo motor and a A-axis bracket; the Z-axis working table is fixedly connected to the cart body; the Z-axis servo motor is connected to one end of the Z-axis working table, and the Z-axis servo motor is connected to the Z-axis slide carriage through a ballscrew-nut pair and is used to drive the Z-axis slide carriage to move up and down; the Z-axis slide carriage is fixedly connected to the Y-axis working table, the Y-axis servo motor is fixed to one end of the Y-axis working table, and the Y-axis servo motor is connected to the Y-axis slide carriage through a ballscrew-nut pair and is used to drive the Y-axis slide carriage to move left and right; the Y-axis slide carriage is fixedly connected to the A-axis working table; the A-axis servo motor is connected to the A-axis working table; the A-axis servo motor is connected to the A-axis bracket and is used to drive the A-axis bracket to rotate, and the A-axis bracket is connected to the first set of laser processing heads.

Further, a longitudinal direction of the Z-axis working table is perpendicular to a longitudinal direction of the Y-axis working table; and the A-axis bracket rotates about a rotation axis perpendicular to the Y-axis working table.

Further, the transport mechanism includes two sets of brackets, two sets of rollers, a first guide rail, a second guide rail spaced apart from the first guide rail, a platform, a first horizontal servo motor and a second horizontal servo motor; the two sets of brackets are respectively a first set of brackets and a second set of brackets, and the first set of brackets are spaced apart from the second set of brackets; two ends of the first set of brackets are respectively connected to the first guide rail and the bottom plate of the laser processing power engineering vehicle; two ends of the second set of brackets are respectively connected to the second guide rail and the bottom plate of the laser processing power engineering vehicle; the first horizontal servo motor and the second horizontal servo motor are respectively fixedly connected to opposite ends of the platform; the two sets of rollers are respectively a first set of rollers and a second set of rollers, an output shaft of the first horizontal servo motor is connected to the first set of rollers through a gear pair, and the first horizontal servo motor is used to drive the first set of rollers to roll along the first guide rail; an output shaft of the second horizontal servo motor is connected to the second set of rollers through a gear pair, and the second horizontal servo motor is used to drive the second set of rollers to roll along the second guide rail.

Further, the transport mechanism further includes a vertical servo motor, a speed reducer, a wire reel, a telescopic rod and a gripping mechanism; the vertical servo motor is fixed on the platform, and its output shaft is connected to the speed reducer; the speed reducer is fixed on the platform, and is connected to the vertical servo motor and the wire reel; the wire reel is connected to the telescopic rod; the gripping mechanism is connected to one end of the telescopic rod away from the platform, and is used to grasp or release the laser processing cart; the vertical servo motor drives the wire reel to rotate by the speed reducer, so that the wire rope of the wire reel is elongated or shortened to pull the telescopic rod to extend or shorten, thereby adjusting the position of the gripping mechanism.

Further, a range sensor is provided on the laser processing power engineering vehicle; the range sensor is used to detect a distance between the laser processing power engineering vehicle and the laser processing cart in real time and feed back the detection result to the first operation interface or the second operation interface of the traction control system in real time, and the first operation interface or the second operation interface of the traction control system controls the movement of the laser processing power engineering vehicle according to the detection result, so that the distance between the laser processing power engineering vehicle and the laser processing cart is kept within a predetermined range.

In general, by comparing the above technical solution of the present invention with the prior art, the present invention has the following beneficial effects:

(1) the onsite steel rail laser processing engineering vehicle adopts a special structural form, so that when the onsite steel rail laser processing engineering vehicle is in the working state of laser processing, the laser processing power engineering vehicle follows the laser processing cart to move, thereby avoiding the adverse effects of the body vibration, motion accuracy and the like of the laser processing power engineering vehicle on the processing accuracy of the steel rails; when the onsite steel rail laser processing engineering vehicle is in the working state of non laser processing, the laser processing cart is housed in the laser processing power engineering vehicle as a whole structural form, and the laser processing power engineering vehicle carries the laser processing cart to quickly reach or leave the site, which improves the effective working time;

(2) amounts of compression of the first front wheel spring and the second front wheel spring are respectively regulated by adjusting air pressure values of the first front wheel cylinder and the second front wheel cylinder, and then the distance between the first coupling frame and the second coupling frame is adjusted such that edges of the first front wheel and the second front wheel are actively abutted against the steel rails on two sides, respectively, and edges of the first rear wheel and the second rear wheel are abutted against the steel rails on two sides, respectively. In this way, the distance between the wheels on two sides of the laser processing cart is adaptively adjusted with the distance between the two steel rails, so that the serpentine movement of the laser processing cart on the track is avoided, and the position of the laser processing head of the laser processing cart relative to the steel rail is not affected by the change of the distance between the steel rails, thereby ensuring the accuracy of onsite laser processing of the steel rails, and thus ensuring the stability and reliability of laser processing quality of the steel rails;

(3) the range sensor is used to detect a distance between the laser processing power engineering vehicle and the laser processing cart in real time and feed back the detection result to the first operation interface or the second operation interface of the traction control system in real time, and the first operation interface or the second operation interface of the traction control system controls the movement of the laser processing power engineering vehicle according to the detection result, so that the distance between the laser processing power engineering vehicle and the laser processing cart is kept within a predetermined range. Thus, on the one hand, the stability of the processing process can be ensured, and on the other hand, collision between the laser processing power engineering vehicle and the laser processing cart can be avoided;

(4) the laser processing power engineering vehicle and the laser processing cart are always connected, and the connection and movement problems of the optical path, circuit, gas path and water path between the laser processing power engineering vehicle and the laser processing cart are solved by using connection components. In the separation and integration process of the laser processing power engineering vehicle and the laser processing cart, the optical path, circuit, gas path and water path are always in a connected state, which avoids disassembly and installation, improves the stability and reliability of the equipment and reduces the overall use time, demonstrating good practicality;

(5) the motion executing mechanism is a three-axis mechanism, by which the movement in the vertical direction, movement in the horizontal direction and rotation of the laser processing heads can be achieved, and the first set of laser processing heads and the second set of laser processing heads can respectively move and rotate to areas to be processed of any one of the two steel rails, so that the laser processing heads can perform laser processing on front and side faces of the steel rails, and laser processing of different parts of the two steel rails can be allowed, which improves the processing efficiency and automation, resulting in high flexibility;

(6) the transport mechanism can realize the rapid adjustment of the position of the laser processing cart, and can quickly transport the laser processing cart into or out of the laser processing power engineering vehicle, thereby improving the automation degree and avoiding artificially placing the laser processing cart; and (7) driving control rooms is provided at the front and rear of the laser processing power engineering vehicle, and cooperates with two sets of laser processing heads, which can meet the requirements of laser processing of steel rails in both forward and reverse directions.

BRIEF DESCRIPTION OF THE DRAWINGS

In all figures, the same elements or structures are denoted by the same reference numerals, in which.

1—laser processing power engineering vehicle, 2—laser processing cart, 2.1—cart body, 2.11—frame, 2.12—first coupling frame, 2.12'—second coupling frame, 2.13—first front wheel cylinder, 2.13'—second front wheel cylinder, 2.14—first front wheel, 2.14'—second front wheel, 2.15—first rear wheel, 2.15'—second rear wheel, 2.16—pull stud, 2.17—first front wheel spring, 2.17'—second front wheel spring, 2.2—first motion executing mechanism, 2.21—Z axis working table, 2.22—Z axis servo motor, 2.23—Z axis slide carriage, 2.24—Y axis working table, 2.25—Y-axis servo motor, 2.26—Y-axis slide carriage, 2.27—A-axis working table, 2.28—A-axis servo motor, 2.29—A-axis bracket, 2.2'—second motion executing mechanism, 2.3—first laser processing head, 2.3'—second laser processing head, 2.4—third laser processing head, 2.4'—fourth laser processing head, 3—transport mechanism, 3.1—first bracket, 3.1'—second bracket, 3.1a—third bracket, 3.1a'—fourth bracket, 3.2—first guide rail, 3.2'—second guide rail, 3.3—first roller, 3.3'—second roller, 3.3a—third roller, 3.3a'—fourth roller, 3.4—platform, 3.5—first horizontal servo motor, 3.5'—second horizontal servo motor, 3.6—vertical servo motor, 3.7—speed reducer, 3.8—wire reel, 3.9—telescopic rod, 3.10—gripping mechanism, 4—front driving control room, 4.1—first operation interface of the traction control system, 4.2—first operation interface of the laser operation control system, 5—rear driving control room, 5.1—second operation interface of the traction control system operation, 5.2—second operation interface of the laser operation control system, 6—generator set, 7—air compressor, 8—refrigerant dryer, 9—electric control cabinet, 10—powder feeder set, 11—gas control cabinet, 12—laser set, 13—refrigeration set, 14—window, 15—partition door, 16—range sensor, G—first steel rail, and G'—second steel rail.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention. Furthermore, the technical features related to the embodiments of the invention described below can be mutually combined if they are not found to be mutually exclusive.

Figure 1:
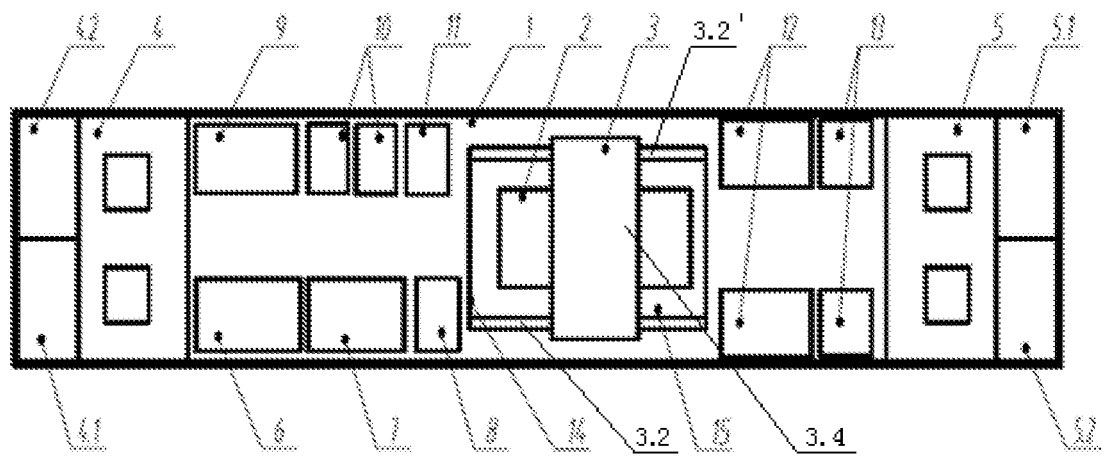
FIG. 1 is a schematic structural diagram of an onsite steel rail laser processing engineering vehicle according to preferred embodiments of the present invention.
Figure 2:
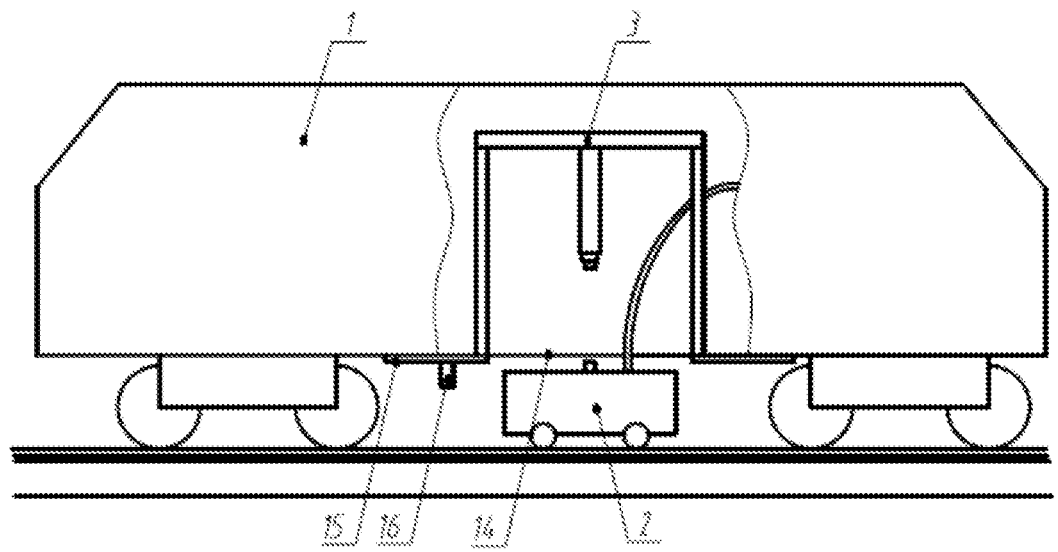
FIG. 2 is a schematic diagram of the onsite steel rail laser processing engineering vehicle in FIG. 1 in use.
Figure 3:
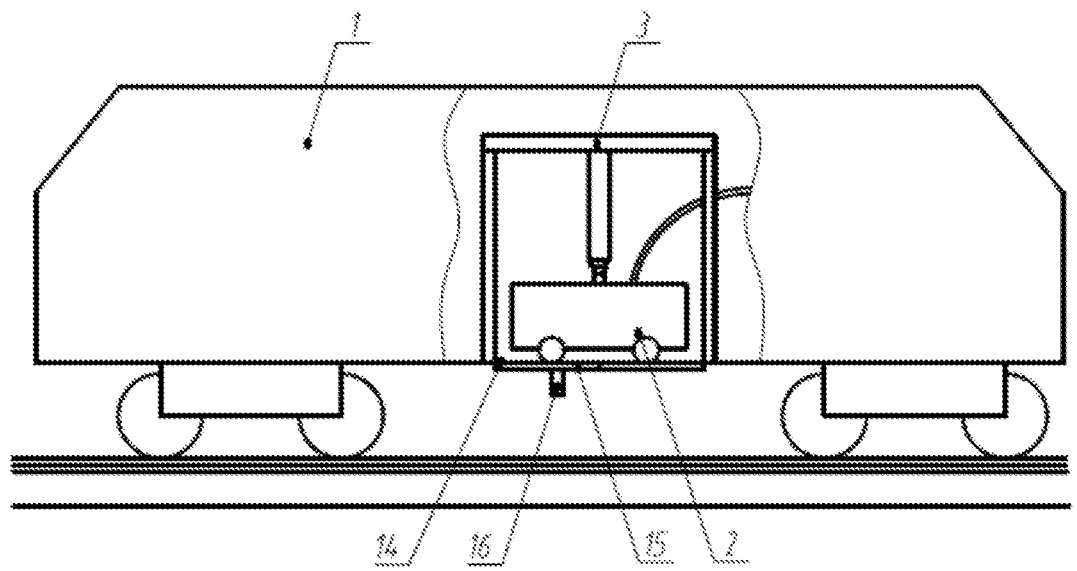
FIG. 3 is a schematic diagram of the onsite steel rail laser processing engineering vehicle in FIG. 1 at the end of use.

Referring to FIG. 1 to FIG. 3, the onsite steel rail laser processing engineering vehicle provided by preferred embodiments of the present invention can simultaneously perform laser processing on different parts of two steel rails at a site, and can quickly leave the site after laser processing. The onsite steel rail laser processing engineering vehicle processes with a high degree of automation, strong function and high efficiency.

The onsite steel rail laser processing engineering vehicle includes a laser processing power engineering vehicle 1, a laser processing cart 2 and a transport mechanism 3, in which the laser processing power engineering vehicle 1 is connected to the laser processing cart 2 through connecting components, and the transport mechanism 3 is disposed on the laser processing power engineering vehicle 1. When the onsite steel rail laser processing engineering vehicle is in a working state of laser processing, the laser processing cart 2 is transported out from the laser processing power engineering vehicle 1 through the transport mechanism to be disposed on the steel rails;

A front driving control room 4 and a rear driving control room 5 are provided in the laser processing power engineering vehicle 1, in which a first operation interface of the traction control system 4.1 and a first operation interface of the laser operation control system 4.2 are provided in the front driving control room 4; a second operation interface of the traction control system 5.1 and a second operation interface of the laser operation control system 5.2 are provided in the rear driving control room 5; the first operation interface of the traction control system 4.1 and the second operation interface of the traction control system 5.1 have the same function; and the first operation interface of the laser operation control system 4.2 and the second operation interface of the laser operation control system 5.2 also have the same function.

The laser processing power engineering vehicle 1 and the laser processing cart 2 are always in a connected state. The transport mechanism 3 is detachably connected to the laser processing cart 2, and is used to transport the laser processing cart 2 out from the laser processing power engineering vehicle 1 and place the laser processing cart 2 on rails, or lift the laser processing cart 2 from the steel rails to transport the laser processing cart 2 into the laser processing power engineering vehicle 1.

When the onsite steel rail laser processing engineering vehicle is in the working state of laser processing, the laser processing cart 2 is placed on the steel rails, and its lower-speed precision travelling motion on the steel rails is achieved by operation of the first operation interface of the laser operation control system 4.2 or the second operation interface of the laser operation control system 5.2 to meet the requirements of laser processing; at the same time, lower-speed precision travelling motion of the laser processing power engineering vehicle 1 on the steel rails is achieved by operation of the first operation interface of the traction control system 4.1 or the second operation interface of the traction control system 5.1, so that the laser processing power engineering vehicle 1 follows the laser processing cart 2, and the distance between them is kept within a predetermined range; when the onsite steel rail laser processing engineering vehicle is in a working state of non laser processing, the laser processing cart 2 is housed in the laser processing power engineering vehicle 1, the movement of the laser processing power engineering vehicle 1 carrying the laser processing cart 2 is achieved by operation of the first operation interface of the traction control system 4.1 or the second operation interface of the traction control system 5.1, and the laser processing power engineering vehicle 1 can run at a faster rate on the steel rails. In the present embodiment, the running speed of the laser processing power engineering vehicle 1 in the working state of laser processing is much smaller than that of the laser processing power engineering vehicle 1 in the working state of non laser processing.

The onsite steel rail laser processing engineering vehicle further includes a generator set 6, an air compressor 7, a refrigerant dryer 8, an electric control cabinet 9, a powder feeder set 10, a gas control cabinet 11, a laser set 12 and a refrigeration set 13, in which the generator set 6 is used for providing the air compressor 7, the refrigerant dryer 8, the electric control cabinet 9, the powder feeder set 10, the gas control cabinet 11, the laser set 12 and the refrigeration set 13 with electrical energy required for operation. In the present embodiment, the powder feeder set 10 conveys powder to the laser processing cart 2 through a pipeline; the laser set 12 may be one of a fiber laser, a diode-pumped solid-state laser, a lamp-pumped solid-state laser, a semiconductor laser and a disk laser. The refrigeration set 13 supplies the cooling water to optical lens on the laser set 12 and the laser processing cart 2 through pipelines. An air outlet of the air compressor 7 is communicated with an air inlet of the refrigerant dryer 8 through a pipeline, and aircoming from the air dryer 8 is transferred to the laser processing cart 2 through a pipeline.

A window 14 is disposed on a bottom plate of the laser processing power engineering vehicle 1, and the bottom plate is further movably connected with a partition door 15 on which a range sensor 16 is provided. The partition door 15 is slidably connected to the bottom plate and closes or exposes the window 14 through sliding. The window 14 is used for the laser processing cart to pass through so as to be housed in or transported out from the laser processing power engineering vehicle 1. The range sensor 16 is used to detect a distance between the laser processing power engineering vehicle 1 and the laser processing cart 2 in real time. In the present embodiment, the range sensor 16 is a laser range sensor. It can be understood that in other embodiments, the range sensor 16 can be other types of range sensors such as an infrared range sensor.

In the present embodiment, the first operation interface of the traction control system 4.1 and the second operation interface of the traction control system 5.1 have the same function, and in actual use, one of the first operation interface of the traction control system 4.1 and the second operation interface of the traction control system 5.1 is enabled to control the starting, stopping, running direction and running speed of the laser processing power engineering vehicle 1; the first operation interface of the laser operation control system 4.2 and the second operation interface of the laser operation control system 5.2 have the same function, and in actual use, one of the first operation interface of the laser operation control system 4.2 and the second operation interface of the laser operation control system 5.2 is enabled. The first operation interface of the laser operation control system 4.2 and the second operation interface of the laser operation control system 5.2 are respectively electrically connected to the electric control cabinet 9, the laser processing cart 2, the powder feeder set 10, the gas control cabinet 11, the laser set 12 and the refrigeration set 13, and both of them can independently control the movement of the laser processing cart 2.

When the onsite steel rail laser processing engineering vehicle is required to perform laser processing on the steel rail surface, the laser processing power engineering vehicle 1 first rapidly runs to the position of the steel rail segment to be processed; then, the first operation interface of the laser operation control system 4.2 or the second operation interface of the laser operation control system 5.2 controls the partition door 15 to open so as to expose the window 14, and then controls the transport mechanism 3 to transport the laser processing cart 2 out from the laser processing power engineering vehicle 1 through the window 14. After the laser processing cart 2 is placed on the steel rails, the transport mechanism 3 is disengaged from the laser processing cart 2 and retracted into the window 14. In the laser processing process, the laser processing power engineering vehicle 1 runs in a low speed mode to ensure that its running speed matches with the running speed of the laser processing cart 2. At the same time, the range sensor 16 detects a distance between the laser processing power engineering vehicle 1 and the laser processing cart 2 in real time, and feeds back the detection result to the first operation interface of the traction control system 4.1 or the second operation interface of the traction control system 5.1 in real time.

In the present embodiment, the distance between the laser processing power engineering vehicle 1 and the laser processing cart 2 is predetermined to be L±s, the distance between the laser processing power engineering vehicle 1 and the laser processing cart 2 detected by the range sensor 16 is X. When X≥L+s or X≤L−s, it indicates that the distance between the laser processing power engineering vehicle 1 and the laser processing cart 2 exceeds a predetermined distance range, and in this case, the first operation interface of the traction control system 4.1 or the second operation interface of the traction control system 5.1 adjusts the running speed of the laser processing power engineering vehicle 1 in a negative feedback manner to ensure that the distance between the laser processing power engineering vehicle 1 and the laser processing cart 2 is always within a predetermined distance range, thereby avoiding collision between them. After the laser processing cart 2 finishes the processing process, the first operation interface of the traction control system 4.1 or the second operation interface of the traction control system 5.1 controls the transport mechanism 3 to transport the laser processing cart 2 back into the laser processing power engineering vehicle 1 and then controls the partition door 15 at the window 14 to close.

Figure 4:
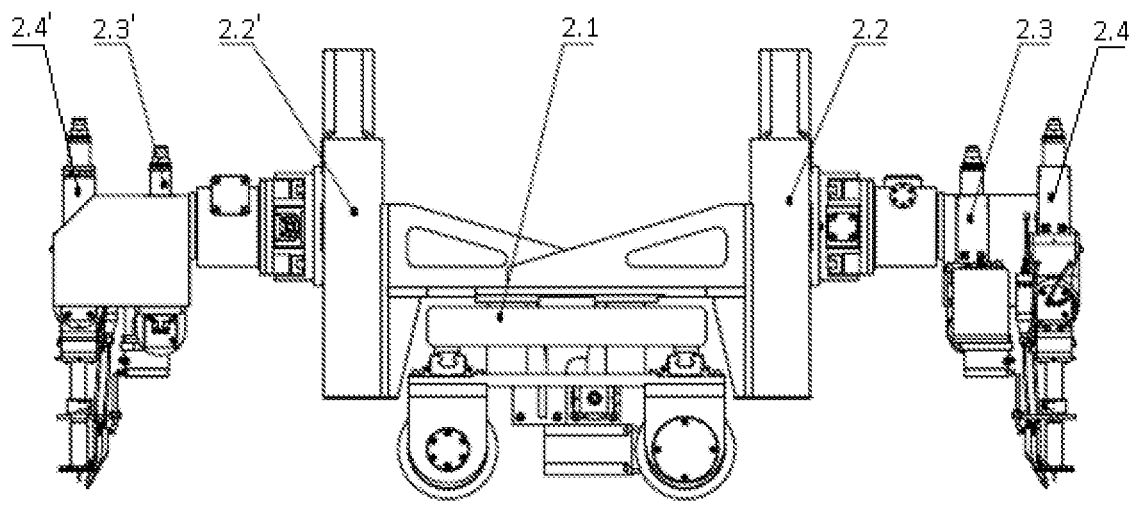
FIG. 4 is a front view of the structure of a laser processing cart of the onsite steel rail laser processing engineering vehicle in FIG. 1.

Referring to FIG. 4, the laser processing cart 2 includes a cart body 2.1, a first motion executing mechanism 2.2, a second motion executing mechanism 2.2', a first set of laser processing heads and a second set of laser processing heads, in which the first motion executing mechanism 2.2 and the second motion executing mechanism 2.2' are respectively connected to opposite ends of the cart body 2.1, and the first set of laser processing heads and the second set of laser processing heads are respectively connected to the first motion executing mechanism 2.2 and the second motion executing mechanism 2.2'. In the present embodiment, the first motion executing mechanism 2.2 and the second motion executing mechanism 2.2' have the same structure; the first set of laser processing heads and the second set of laser processing heads have the same structure; the first set of laser processing heads includes a first laser processing head 2.3 and a third laser processing head 2.4 that are spaced apart; the second set of laser processing heads includes a second laser processing head 2.3' and a fourth laser processing head 2.4' that are spaced apart; and it can be understood that in other embodiments, both of the first set of laser processing heads and the second set of laser processing heads may include more than two (such as three, four and five) laser processing heads. The first motion executing mechanism 2.2 and the second motion executing mechanism 2.2' are respectively used to drive the first set of laser processing heads and the second set of laser processing heads to move so as to adjust the attitude of the first set of laser processing heads and the attitude of the second set of laser processing heads, thereby meeting the requirements of the set laser focal length and laser normal angle. In the present embodiment, the laser set 12 transmits laser beams to the first set of laser processing heads and the second set of laser processing heads through an optical fiber transmission system, and the laser beams then act on the workpiece surfaces.

Figure 10:
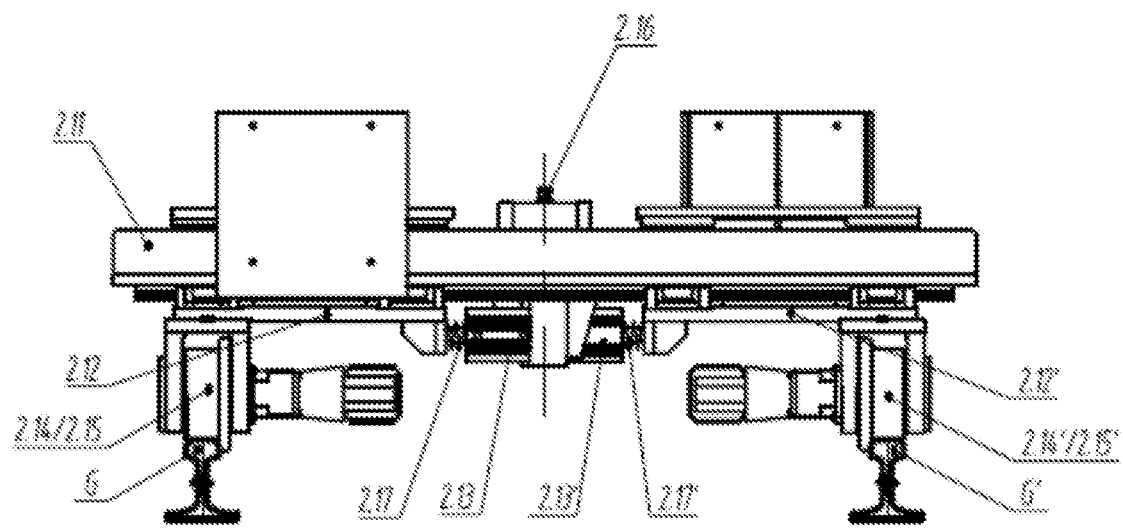
FIG. 10 is a side view of the laser processing cart in FIG. 1 in use.

Referring to FIG. 10, the cart body 2.1 includes a frame 2.11, a first coupling frame 2.12, a second coupling frame 2.12', a first front wheel cylinder 2.13, a second front wheel cylinder 2.13', a first front wheel 2.14, a first rear wheel 2.15, a second front wheel 2.14', a second rear wheel 2.15', a pull stud 2.16, a first front wheel spring 2.17 and a second front wheel spring 2.17', in which the first coupling frame 2.12 and the second coupling frame 2.12' are respectively slidably connected to one side of the frame 2.11 facing the track. In the present embodiment, the first coupling frame 2.12 and the second coupling frame 2.12' have the same structure; and the coupling frames and the frame 2.11 are slidably connected by means of cooperation of the linear guides and the slide carriages.

The first front wheel cylinder 2.13 and the second front wheel cylinder 2.13' are respectively fixed to the bottom of the frame 2.11, and are located on the same side of the frame 2.11 with the first coupling frame 2.12. In the present embodiment, the first front wheel cylinder 2.13 and the second front wheel cylinder 2.13' are located between the first coupling frame 2.12 and the second coupling frame 2.12'. The first front wheel 2.14 and the first rear wheel 2.15 are mounted on the bottom of the first coupling frame 2.12; the second front wheel 2.14' and the second rear wheel 2.15' are mounted on the bottom of the second coupling frame 2.12'. A piston rod of the first front wheel cylinder 2.13 and a piston rod of the second front wheel cylinder 2.13' are fixedly connected to inner sides of the first coupling frame 2.12 and the second coupling frame 2.12' through the first front wheel spring 2.17 and the second front wheel spring 2.17', respectively. The pull stud 2.16 is fixed on the frame 2.11, and the pull stud 2.16 and the first coupling frame 2.12 are located on opposite sides of the frame 2.11.

After the laser processing cart 2 is placed on the steel rails, the first front wheel spring 2.17 and the second front wheel spring 2.17' are respectively compressed according to predetermined air pressure values of the first front wheel cylinder 2.13 and the second front wheel cylinder 2.13' to produce appropriate amounts of compression; when the distance between the first steel rail G and the second steel rail G' is increased, the first front wheel spring 2.17 and the second front wheel spring 2.17' are elongated, so that pushing forces toward the outside of the steel rails are generated for the first coupling frame 2.12 and the second coupling frame 2.12', respectively. Under the action of the pushing forces, the first coupling frame 2.12 drives the first front wheel 2.14 and the first rear wheel 2.15 to actively slide along the frame 2.11 to approach the inner side of the first steel rail G, and the second coupling frame 2.12' drives the second front wheel 2.14' and the second rear wheel 2.15' to passivity slide along the frame 2.11 to approach the inner side of the second steel rail G', thereby ensuring that the first set of laser processing heads and the second set of laser processing heads are always aligned with processing parts of the first steel rail G and the second steel rail G', respectively. When the distance between the first steel rail G and the second steel rail G' is reduced, the first front wheel spring 2.17 and the second front wheel spring 2.17' are reversely compressed to increase the amount of compression, thereby ensuring the accuracy of the laser processing of the laser processing cart 2 on the steel rails.

Figure 5:
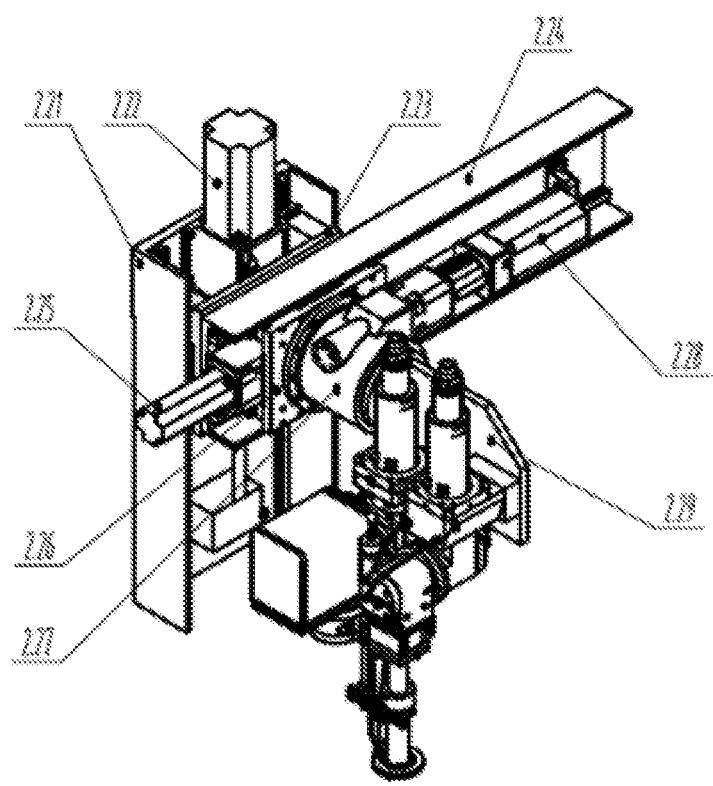
FIG. 5 is a schematic structural diagram of a motion executing mechanism of the laser processing cart in FIG. 4.

Referring to FIG. 5, the first motion executing mechanism 2.2 includes a Z-axis working table 2.11, a Z-axis servo motor 2.22, a Z-axis slide carriage 2.23, a Y-axis working table 2.24, a Y-axis servo motor 2.25, a Y-axis slide carriage 2.26, a A-axis working table 2.27, a A-axis servo motor 2.28 and a A-axis bracket 2.29. In the present embodiment, the Z axis, the Y axis, and the A axis are perpendicular to each other; and the first motion executing mechanism 2.2 is a three-axis mechanism, which is similar to a three-axis machine tool. The Z-axis working table 2.21 is fixedly connected to the cart body 2.1. The Z-axis servo motor 2.22 is connected to one end of the Z-axis working table 2.21. Further, the Z-axis servo motor 2.22 is connected to the Z-axis slide carriage 2.23 by a ballscrew-nut pair and is used to drive the Z-axis slide carriage 2.23 to move up and down. The Z-axis slide carriage 2.23 is fixedly connected to the Y-axis working table 2.24. In the present embodiment, the longitudinal direction of the Z-axis working table 2.21 is perpendicular to the longitudinal direction of the Y-axis working table 2.24.

The Y-axis servo motor 2.25 is fixed to one end of the Y-axis working table 2.24. Further, the Y-axis servo motor 2.25 is connected to the Y-axis slide carriage 2.26 by a ballscrew-nut pair and can drive the Y-axis slide carriage 2.26 to move left and right. The Y-axis slide carriage 2.26 is fixedly connected to the A-axis working table 2.27. The A-axis servo motor 2.28 is connected to the A-axis working table 2.27. In the present embodiment, the A-axis servo motor 2.28 rotates the A-axis bracket 2.29 through a speed reducer and a worm and worm gear, and the A-axis bracket 2.29 has a rotation angle of −85° to +85°; the A-axis bracket 2.29 is connected to the first set of laser processing heads.

Figure 6:
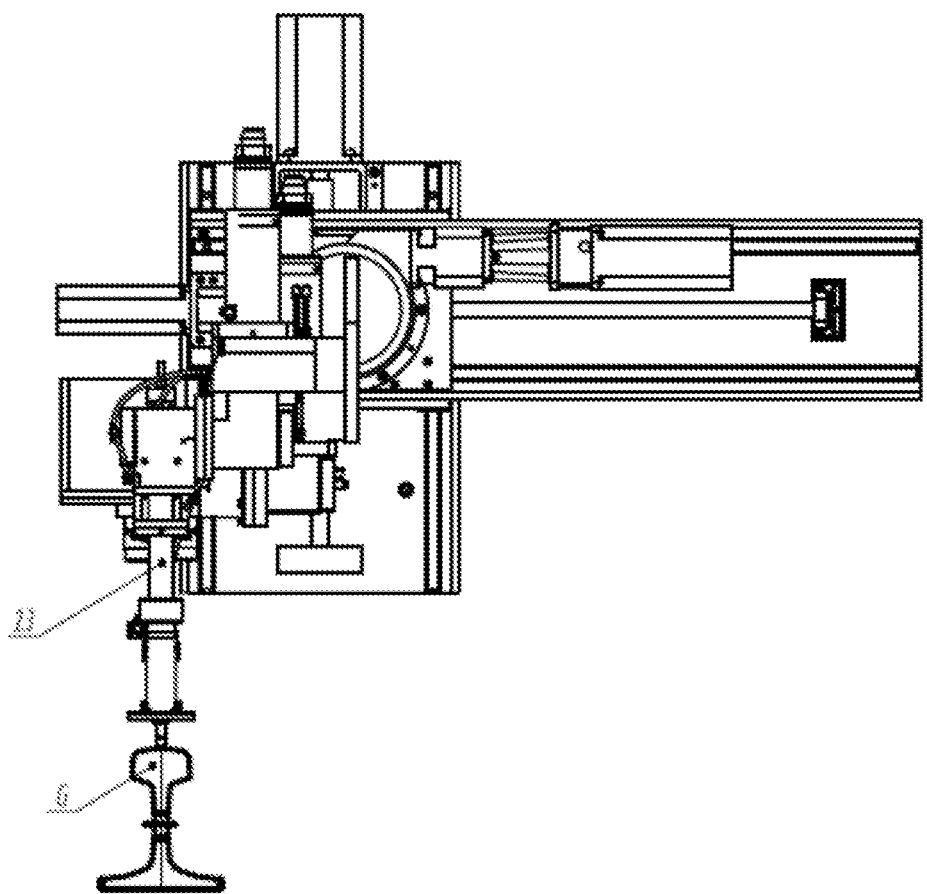
FIG. 6 is a partial schematic diagram of a laser processing head on the motion executing mechanism in FIG. 5 when performing laser processing on the front face of the steel rail.

Referring to FIG. 6, when the laser processing cart 2 is required to perform laser processing on the front part of the steel rail, the first operation interface of the laser operation control system 4.2 or the second operation interface of the laser operation control system 5.2 controls the Y-axis servo motor 2.25 to drive the Y-axis slide carriage 2.26 and the A-axis working table 2.27 together to move toward one side of the first steel rail G, such that the first set of laser processing heads are located directly above the first steel rail G; meanwhile, the first operation interface of the laser operation control system 4.2 or the second operation interface of the laser operation control system 5.2 controls the Z-axis servo motor 2.22 to drive the Z-axis slide carriage 2.23 and the Y-axis working table 2.24 to move together, such that the relative focus of the first set of laser processing heads falls on the surface of the first steel rail G. In this way, the adjustment of position of the first set of laser processing heads is completed.

Figure 7:
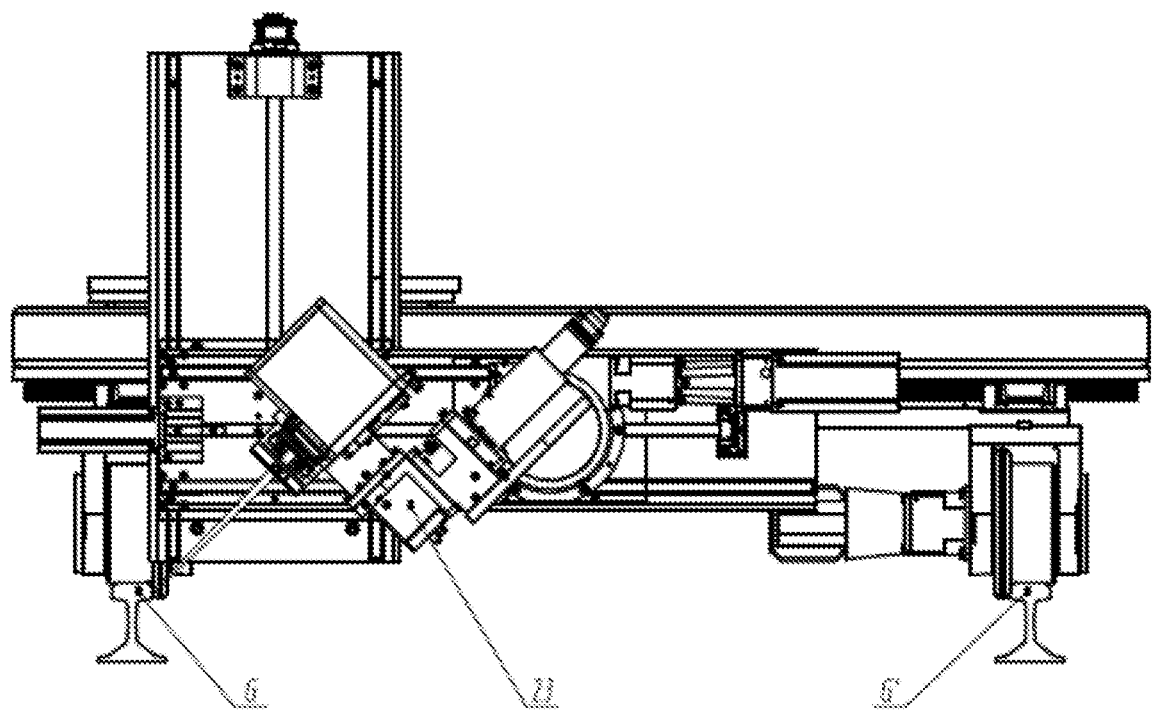
FIG. 7 is a schematic diagram of the laser processing head on the motion executing mechanism in FIG. 5 when performing laser processing on the side face of the steel rail.

Referring to FIG. 7, when the laser processing cart 2 is required to perform laser processing on the inner side part of the steel rail, the first operation interface of the laser operation control system 4.2 or the second operation interface of the laser operation control system 5.2 controls the Y-axis servo motor 2.25 to drive the Y-axis slide carriage 2.26 and the A-axis working table 2.27 together to move close to the first steel rail G; the first operation interface of the laser operation control system 4.2 or the second operation interface of the laser operation control system 5.2 simultaneously controls the Z-axis servo motor 2.22 to drive the Z-axis slide carriage 2.23 and the Y-axis working table 2.24 together to move downward, such that the first set of laser processing heads are lowered to a proper position; the first operation interface of the laser operation control system 4.2 or the second operation interface of the laser operation control system 5.2 further controls the A-axis servo motor 2.28 to drive the A-axis bracket 2.29 to rotate clockwise, such that the first set of laser processing head is aligned with the inner side part of the first steel rail G. In this way, the adjustment of position and attitude of the first set of laser processing heads is completed.

Figure 8:
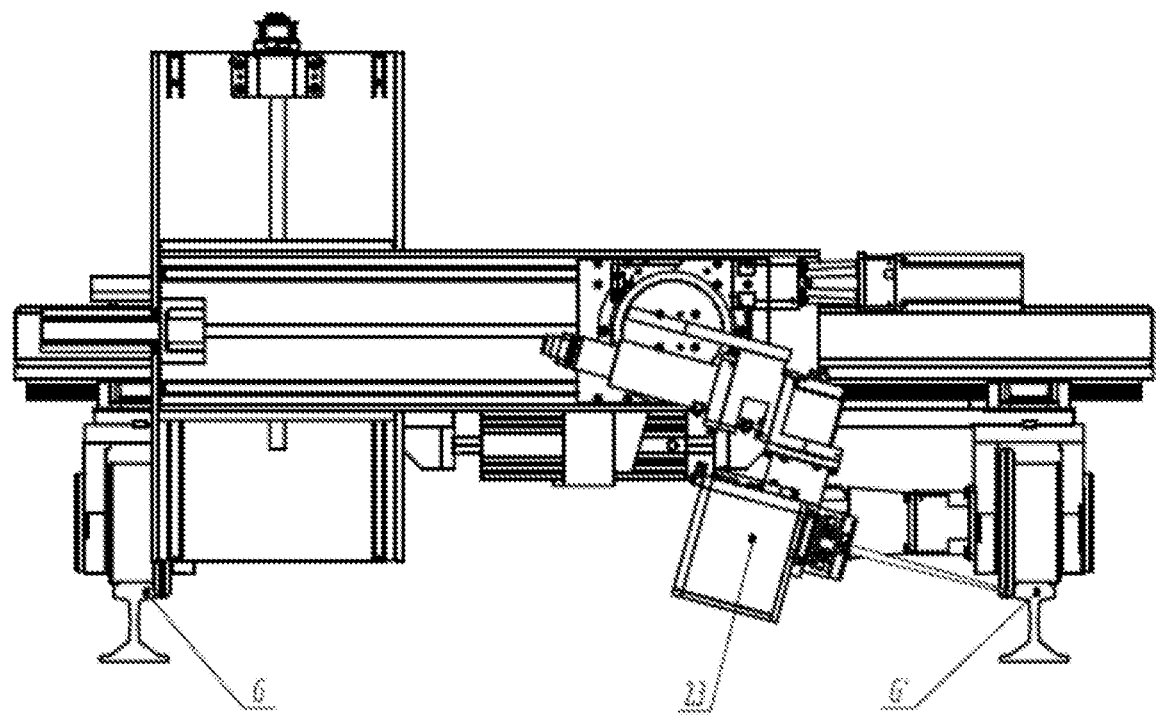
FIG. 8 is another schematic diagram of the laser processing head on the motion executing mechanism in FIG. 5 when performing laser processing on the side face of the steel rail.

Referring to FIG. 8, when the first motion executing mechanism 2.2 is required to perform laser processing on the inner side part of the second steel rail G', the first operation interface of the laser operation control system 4.2 or the second operation interface of the laser operation control system 5.2 controls the Y-axis servo motor 2.25 to drive the Y-axis slide carriage 2.26 and the A-axis working table 2.27 together to move close to the second steel rail G'; simultaneously, the first operation interface of the laser operation control system 4.2 or the second operation interface of the laser operation control system 5.2 controls the Z-axis servo motor 2.22 to drive the Z-axis slide carriage 2.23 and the Y-axis working table 2.24 together to move downward, such that the first set of laser processing heads are lowered to a proper position; the first operation interface of the laser operation control system 4.2 or the second operation interface of the laser operation control system 5.2 further controls the A-axis servo motor 2.28 to drive the A-axis bracket 2.29 to rotate clockwise, such that the first set of laser processing head is aligned with the inner side part of the second steel rail G'. In this way, the adjustment of position and attitude of the first set of laser processing heads is completed.

The first operation interface of the laser operation control system 4.2 or the second operation interface of the laser operation control system 5.2 can simultaneously control the second motion executing mechanism 2.2' to complete the adjustment of position and attitude of the second set of laser processing heads as shown in FIGS. 6, 7 and 8. By different position and attitude adjustments of the first set of laser processing heads and the second set of laser processing heads, the laser processing cart 2 can process different parts of the two steel rails (the first steel rail G and the second steel rail G') in various ways to meet the requirements of different types of steel rails for laser processing.

Figure 9:
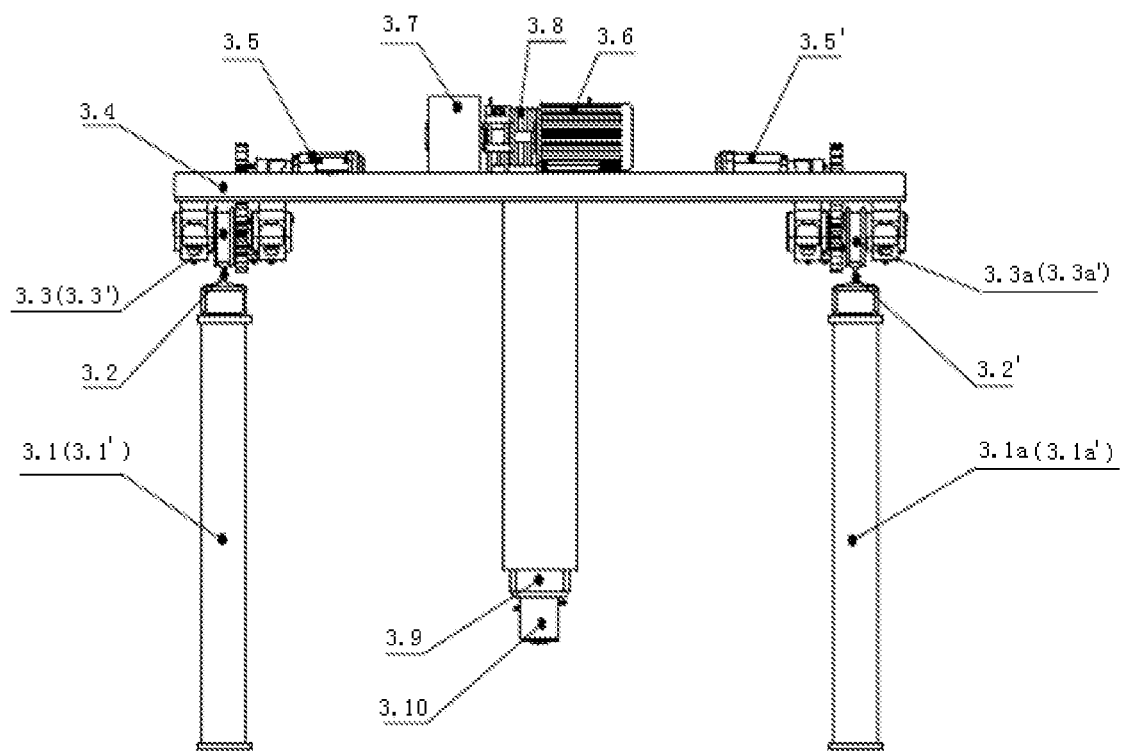
FIG. 9 is a schematic structural diagram of a transport mechanism of the onsite steel rail laser processing engineering vehicle in FIG. 1.

Referring to FIG. 9, the transport mechanism 3 includes two sets of brackets, two sets of rollers, a first guide rail 3.2, a second guide rail 3.2', a platform 3.4, a first horizontal servo motor 3.5, a second horizontal servo motor 3.5', a vertical servo motor 3.6, a speed reducer 3.7, a wire reel 3.8, a telescopic rod 3.9 and a gripping mechanism 3.10, in which the two sets of brackets are respectively a first set of brackets and a second set of brackets; the first set of brackets include a first bracket 3.1 and a second bracket 3.1' disposed in the same direction; the second set of brackets include a third bracket 3.1a and a fourth bracket 3.1a' disposed in the same direction; two ends of the first set of brackets are respectively connected to the first guide rail 3.2 and the bottom plate of the laser processing power engineering vehicle 1; and two ends of the second set of brackets are respectively connected to the second guide rail 3.2' and the bottom plate of the laser processing power engineering vehicle 1. In the present embodiment, the first set of brackets and the second set of brackets are spaced apart from each other and arranged in parallel. The two sets of rollers are respectively a first set of rollers and a second set of rollers, and the first set of rollers and the second set of rollers are respectively disposed on the first guide rail 3.2 and the second guide rail 3.2'. The first set of rollers includes a first roller 3.3 and a second roller 3.3' which are coaxially disposed; and the second set of rollers includes a third roller 3.3a and a fourth roller 3.3a' which are coaxially disposed.

The first horizontal servo motor 3.5 and the second horizontal servo motor 3.5' are fixedly connected to opposite ends of the platform 3.4, respectively. An output shaft of the first horizontal servo motor 3.5 is connected to the first set of rollers via a gear pair, and thus the first horizontal servo motor 3.5 is capable of driving the first set of rollers to roll along the first steel rail 3.2. An output shaft of the second horizontal servo motor 3.5' is connected to the second set of rollers via a gear pair, and thus the second horizontal servo motor 3.5' is capable of driving the second set of rollers to roll along the second steel rail 3.2'. In the present embodiment, the first horizontal servo motor 3.5 and the second horizontal servo motor 3.5' operate synchronously, so that the platform 3.4 can move along the first steel rail 3.2.

The vertical servo motor 3.6 is fixed in the middle of the platform 3.4, and its output shaft is connected to the speed reducer 3.7. The speed reducer 3.7 is fixed to the platform 3.4, and is connected to the vertical servo motor 3.6 and the wire reel 3.8. The wire reel 3.8 is connected to the telescopic rod 3.9. The gripping mechanism 3.10 is connected to one end of the telescopic rod 3.9 away from the platform 3.4, and is used to grasp or release the pull stud 2.16 so that the transport mechanism 3 is connected to or disengaged from the laser processing cart 2. The gripping mechanism 3.10 is pneumatically controlled, and by the grasp or release control of the gripping mechanism 3.10 and the telescopic control of the telescopic rod 3.9, the transport mechanism 3 can transport the laser processing cart 2 into or out from the laser processing power engineering vehicle 1 via the window 14. The vertical servo motor 3.6 drives the wire reel 3.8 to rotate through the speed reducer 3.7, so that the wire rope of the wire reel 3.8 is elongated or shortened to pull the telescopic rod 3.9 to extend or shorten, thereby adjusting the position of the gripping mechanism 3.10.

It can be understood that in other embodiments, the laser processing power engineering vehicle 1 may further include a steel rail heat treatment system, a steel rail surface cleaning system, a monitoring and lighting system, a safety protection mechanism and the like. The transport mechanism 3 can be replaced with other mechanisms having the same function.

When the onsite steel rail laser processing engineering vehicle performs laser strengthening on the steel rails at a site, the generator set 6 is first started to supply power to the equipment system, and then the first operation interface of the traction control system 4.1 or the second operation interface of the laser operation control system 5.1 is selected and started as a traction control system, so that the laser processing power engineering vehicle 1 quickly runs to an area to be processed.

After the laser processing power engineering vehicle 1 reaches the area to be processed, the first operation interface of the laser operation control system 4.2 or the second operation interface of the laser operation control system 5.2 is selected and started as a laser operation control system. After the partition door 15 on the bottom plate of the laser processing power engineering vehicle 1 is controlled by the selected laser operation control system to open, the gripping mechanism 3.10 of the transport mechanism 3 is started to grasp the pull stud 2.16 of the laser processing cart 2 so as to place the laser processing cart 2 on the steel rails through the window 14; subsequently, the gripping mechanism 3.10 is controlled to release the pull stud 2.16 while the telescopic rod 3.9 of the gripping mechanism 3.10 is retracted. At this time, the laser processing cart 2 is mechanically disconnected from the laser processing power engineering vehicle 1, but there is still circuit, water path, gas path and optical path connection therebetween.

Thereafter, the first front wheel cylinder 2.13 and the second front wheel cylinder 2.13' at the bottom of the frame 2.11 are loaded according to the set air pressure, and piston rods of the first front wheel cylinder 2.13 and the second front wheel cylinder 2.13' are respectively supported against inner sides of the first coupling frame 2.12 and the second coupling frame 2.12' through the first front wheel spring 2.17 and the second front wheel spring 2.17', thereby enabling rims of the first front wheel 2.14, the second front wheel 2.14', the first rear wheel 2.15 and the second rear wheel 2.15' to be always abutted against inner sides of the steel rails, so that the distance between wheels on both sides of the laser processing cart 2 can be adaptively adjusted and changed according to the distance between the two steel rails. In this way, the serpentine movement of the laser processing cart 2 can be avoided, thereby ensuring the accuracy and stability of the first set of laser processing heads and the second set of laser processing heads relative to the steel rails.

Then, the first set of laser processing heads or the second set of laser processing heads are adjusted by the first motion executing mechanism 2.2 or the second motion executing mechanism 2.2' to a proper position and attitude relative to the first steel rail G or the second steel rail G' such that the first set of laser processing heads or the second set of laser processing heads are located at a position to be processed.

Laser processing can be performed on the side face of either of the two steel rails by a single laser processing head.

Then, the laser set 12, the refrigeration set 13, the air compressor 7, the refrigerant dryer 8 and the electric control cabinet 9 are turned on; a laser processing program is written on the selected operation interface of the laser operation control system (the first operation interface of the laser operation control system 4.2 or the second operation interface of the laser operation control system 5.2) and then the laser processing program is started; the laser processing cart 2 moves according to the set trajectory, and the laser beam outputted by the laser set 12 is transmitted to the first set of laser processing heads or the second set of laser processing heads through the optical fiber transmission system and acts on the workpiece surface. In the laser processing process, the laser processing power engineering vehicle 1 runs autonomously in a low speed mode to follow the laser processing cart 2 to move; the range sensor 16 monitors and feeds back the distance between the laser processing power engineering vehicle 1 and the laser processing cart 2 in real time, and the selected operation interface of the traction control system (the first operation interface of the traction control system 4.1 or the second operation interface of the traction control system 5.1) timely adjusts the running speed of the laser processing power engineering vehicle 1 to ensure that the distance between the laser processing power engineering vehicle 1 and the laser processing cart 2 is always within a predetermined distance range.

After the laser processing cart 2 finishes the processing process, the laser set 12, the refrigeration set 13, the air compressor 7, the refrigerant dryer 8 and the electric control cabinet 9 are turned off. At the same time, the first front wheel cylinder 2.13 and the second front wheel cylinder 2.13' at the bottom of the frame 2.11 are reversely loaded according to the set air pressure, and the piston rods of the first front wheel cylinder 2.13 and the second front wheel cylinder 2.13' drives the first coupling frame 2.12 and the second coupling frame 2.12' to be retracted, so that the first front wheel 2.14 and the first rear wheel 2.15 are separated from the inner side of the one-sided steel rail.

Then, the selected operation interface of the laser operation control system (the first operation interface of the laser operation control system 4.2 or the second operation interface of the laser operation control system 5.2) issues instructions to control the transport mechanism 3 such that the gripping mechanism 3.10 extends out and grasps the pull stud 2.16 of the laser processing cart 2 to transport the laser processing cart 2 back into the laser processing power engineering vehicle 1 through the window 14, and then to control the partition door 15 to close.

Thereafter, the operation interface of the selected traction control system (the first operation interface of the traction control system 4.1 or the second operation interface of the traction control system 5.1) is operated such that the laser processing power engineering vehicle 1 quickly leaves the processing site, and finally the selected operation interface of the traction control system (the first operation interface of the traction control system 4.1 or the second operation interface of the traction control system 5.1) and the generator set 6 are sequentially turned off. In the above process, the powder feeder set 10 is started to perform onsite laser cladding repair on the steel rails.

The onsite steel rail laser processing engineering vehicle provided by the present invention adopts a separate and combined structural form, in which when the onsite steel rail laser processing engineering vehicle is in the working state of laser processing, the laser processing power engineering vehicle follows the laser processing cart to move, so that the adverse effects of the body vibration, motion accuracy and the like of the laser processing power engineering vehicle on the laser processing accuracy of the steel rails can be avoided; when the onsite steel rail laser processing engineering vehicle is in the working state of non laser processing, the laser processing cart is housed in the laser processing power engineering vehicle as a whole structural form. The laser processing power engineering vehicle can quickly reach or leave the site with the laser processing cart carried, which reduces time consumption and improves the efficiency. In addition, the motion executing mechanism can automatically adjust the distance between the two coupling frames, so that the width between the wheels on the two sides of the laser processing cart is adapted to the distance between the two steel rails, which avoids the serpentine movement of the laser processing cart, improves the accuracy of the laser processing on the steel rails, and is beneficial to improve the processing quality.

It should be readily understood to those skilled in the art that the above description is only preferred embodiments of the present invention, and does not limit the scope of the present invention. Any change, equivalent substitution and modification made without departing from the spirit and scope of the present invention should be included within the scope of the protection of the present invention.

What is claimed is:

1. An onsite steel rail laser processing engineering vehicle, comprising a laser processing power engineering vehicle and a laser processing cart, characterized in that the laser processing power engineering vehicle is connected to the laser processing cart; the onsite steel rail laser processing engineering vehicle further comprises a transport mechanism disposed on the laser processing power engineering vehicle; through movement and rotation, the transport mechanism transports the laser processing cart into the laser processing power engineering vehicle or transports the laser processing cart out from the laser processing power engineering vehicle and places it on rails;

the laser processing power engineering vehicle and the laser processing cart are presented as a separate and combined structure, and when the laser processing cart is housed in the laser processing power engineering vehicle, the laser processing power engineering vehicle is capable of running with the laser processing cart carried; when the laser processing cart is placed on the steel rails by the transport mechanism, the laser processing power engineering vehicle follows the laser processing cart to move on the steel rails so that the distance between them is kept within a predetermined range.

2. The onsite steel rail laser processing engineering vehicle of claim 1, characterized in that a front driving control room and a rear driving control room are provided in the laser processing power engineering vehicle, and a first operation interface of the traction control system and a first operation interface of the laser operation control system are provided in the front driving control room; a second operation interface of the traction control system and a second operation interface of the laser operation control system are provided in the rear driving control room; the first operation interface of the traction control system and the second operation interface of the traction control system have the same function; the first operation interface of the laser operation control system and the second operation interface of the laser operation control system also have the same function;

when the onsite steel rail laser processing engineering vehicle is in a working state of laser processing, the laser processing cart is placed on the steel rails, and its movement is controlled by the first operation interface of the laser operation control system or the second operation interface of the laser operation control system to meet the requirements of laser processing; meanwhile, the movement of the laser processing power engineering vehicle on the steel rails is controlled by the first operation interface of the traction control system or the second operation interface of the traction control system to enable the laser processing power engineering vehicle to follow the laser processing cart; when the onsite steel rail laser processing engineering vehicle is in a working state of no laser processing, the laser processing cart is housed in the laser processing power engineering vehicle, and a running speed of the laser processing power engineering vehicle is larger than that of the laser processing power engineering vehicle in the working state of laser processing.

3. The onsite steel rail laser processing engineering vehicle of claim 1, characterized in that the laser processing cart includes a first motion executing mechanism and a first set of laser processing heads connected to the first motion executing mechanism, in which the first motion executing mechanism is a three-axis mechanism and is capable of adjusting the position and attitude of the first set of laser processing heads through movement and rotation, thereby enabling the first set of laser processing heads to perform laser processing on different parts of the two steel rails.

4. The onsite steel rail laser processing engineering vehicle of claim 3, characterized in that the laser processing cart further includes a cart body, a second motion executing mechanism and a second set of laser processing heads, the first motion executing mechanism and the second motion executing mechanisms are respectively connected to opposite ends of the cart body and have the same structure; the second set of laser processing heads are connected to the second motion executing mechanisms, and the first set of laser processing heads and the second set of laser processing heads have the same structure; the first set of laser processing heads and the second set of laser processing heads each comprise more than two laser processing heads.

5. The onsite steel rail laser processing engineering vehicle of claim 4, characterized in that the cart body includes a frame, a first coupling frame and a second coupling frame that are slidably connected to opposite ends of the frame, a first front wheel cylinder and a second front wheel cylinder that are fixed on the frame and located between the first coupling frame and the second coupling frame, a first front wheel and a first rear wheel mounted on the bottom end of the first coupling frame, a second front wheel and a second rear wheel mounted on the second coupling frame, a piston rod connected to the first front wheel cylinder, a first front wheel spring of the first coupling frame, a piston rod connected to the second front wheel cylinder and a second front wheel spring of the second coupling frame; amounts of compression of the first front wheel spring and the second front wheel spring are respectively regulated by adjusting air pressure values of the first front wheel cylinder and the second front wheel cylinder, and then the distance between the first coupling frame and the second coupling frame is adjusted such that edges of the first front wheel and the second front wheel are actively abutted against the steel rails on two sides, respectively, and edges of the first rear wheel and the second rear wheel are abutted against the steel rails on two sides, respectively.

6. The onsite steel rail laser processing engineering vehicle of claim 4, characterized in that the first motion executing mechanism includes a Z-axis working table, a Z-axis servo motor, a Z-axis slide carriage, a Y-axis working table, a Y-axis servo motor, a Y-axis slide carriage, a A-axis working table, a A-axis servo motor and a A-axis bracket; the Z-axis working table is fixedly connected to the cart body; the Z-axis servo motor is connected to one end of the Z-axis working table, and the Z-axis servo motor is connected to the Z-axis slide carriage through a ballscrew-nut pair and is used to drive the Z-axis slide carriage to move up and down; the Z-axis slide carriage is fixedly connected to the Y-axis working table, the Y-axis servo motor is fixed to one end of the Y-axis working table, and the Y-axis servo motor is connected to the Y-axis slide carriage through a ballscrew-nut pair and is used to drive the Y-axis slide carriage to move left and right; the Y-axis slide carriage is fixedly connected to the A-axis working table; the A-axis servo motor is connected to the A-axis working table; the A-axis servo motor is connected to the A-axis bracket and is used to drive the A-axis bracket to rotate, and the A-axis bracket is connected to the first set of laser processing heads.

7. The onsite steel rail laser processing engineering vehicle of claim 6, characterized in that a longitudinal direction of the Z-axis working table is perpendicular to a longitudinal direction of the Y-axis working table; and the A-axis bracket rotates about a rotation axis perpendicular to the Y-axis working table.

8. The onsite steel rail laser processing engineering vehicle of claim 1, characterized in that the transport mechanism includes two sets of brackets, two sets of rollers, a first guide rail, a second guide rail spaced apart from the first guide rail, a platform, a first a horizontal servo motor and a second horizontal servo motor; the two sets of brackets are respectively a first set of brackets and a second set of brackets, and the first set of brackets are spaced apart from the second set of brackets; two ends of the first set of brackets are respectively connected to the first guide rail and the bottom plate of the laser processing power engineering vehicle; two ends of the second set of brackets are respectively connected to the second guide rail and the bottom plate of the laser processing power engineering vehicle; the first horizontal servo motor and the second horizontal servo motor are respectively fixedly connected to opposite ends of the platform; the two sets of rollers are respectively a first set of rollers and a second set of rollers, an output shaft of the first horizontal servo motor is connected to the first set of rollers through a gear pair, and the first horizontal servo motor is used to drive the first set of rollers to roll along the first guide rail; an output shaft of the second horizontal servo motor is connected to the second set of rollers through a gear pair, and the second horizontal servo motor is used to drive the second set of rollers to roll along the second guide rail.

9. The onsite steel rail laser processing engineering vehicle of claim 8, characterized in that the transport mechanism further includes a vertical servo motor, a speed reducer, a wire reel, a telescopic rod and a gripping mechanism; the vertical servo motor is fixed on the platform, and its output shaft is connected to the speed reducer; the speed reducer is fixed on the platform, and is connected to the vertical servo motor and the wire reel; the wire reel is connected to the telescopic rod; the gripping mechanism is connected to one end of the telescopic rod away from the platform, and is used to grasp or release the laser processing cart; the vertical servo motor drives the wire reel to rotate by the speed reducer, so that the wire rope of the wire reel is elongated or shortened to pull the telescopic rod to extend or shorten, thereby adjusting the position of the gripping mechanism.

10. The onsite steel rail laser processing engineering vehicle of claim 1, characterized in that a range sensor is provided on the laser processing power engineering vehicle; the range sensor is used to detect a distance between the laser processing power engineering vehicle and the laser processing cart in real time and feed back the detection result to the first operation interface of the traction control system or the second operation interface of the traction control system in real time, the first operation interface of the traction control system or the second operation interface of the traction control system controls the movement of the laser processing power engineering vehicle according to the detection result, so that the distance between the laser processing power engineering vehicle and the laser processing cart is kept within a predetermined range.

\* \* \* \* \*